(12) United States Patent
Inaba et al.

(10) Patent No.: US 11,867,871 B2
(45) Date of Patent: Jan. 9, 2024

(54) OPTICAL CONNECTOR

(71) Applicant: SUMITOMO ELECTRIC OPTIFRONTIER CO., LTD., Yokohama (JP)

(72) Inventors: Takahiro Inaba, Yokohama (JP); Yoshikyo Tamekuni, Yokohama (JP); Yoshihiro Takeyama, Yokohama (JP); Mitsumasa Seita, Komaki (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 366 days.

(21) Appl. No.: 17/398,035

(22) Filed: Aug. 10, 2021

(65) Prior Publication Data

US 2021/0364704 A1 Nov. 25, 2021

Related U.S. Application Data

(63) Continuation-in-part of application No. 17/150,523, filed on Jan. 15, 2021, now Pat. No. 11,409,053.

(30) Foreign Application Priority Data

Feb. 19, 2020 (JP) .................................. 2020-026022
May 21, 2021 (JP) .................................. 2021-086242

(51) Int. Cl.
*G02B 6/38* (2006.01)
(52) U.S. Cl.
CPC ........... *G02B 6/387* (2013.01); *G02B 6/3826* (2013.01); *G02B 6/3874* (2013.01); *G02B 6/3878* (2013.01); *G02B 6/3893* (2013.01)

(58) Field of Classification Search
CPC ..... G02B 6/387; G02B 6/3826; G02B 6/3874; G02B 6/3878; G02B 6/3893; G02B 6/3879; G02B 6/3825
See application file for complete search history.

(56) References Cited

U.S. PATENT DOCUMENTS

| | | | | |
|---|---|---|---|---|
| 9,684,130 B2 * | 6/2017 | Veatch | ................. | G02B 6/2726 |
| 9,971,102 B2 * | 5/2018 | Raven | ................. | G02B 6/3898 |
| 10,042,129 B2 * | 8/2018 | Taira | ................. | G02B 6/3885 |
| 11,002,923 B2 * | 5/2021 | Ho | ..................... | G02B 6/3879 |
| 11,237,342 B2 * | 2/2022 | Iizumi | ................. | G02B 6/3878 |
| 2018/0252872 A1 * | 9/2018 | Chen | .................... | G02B 6/3893 |
| 2018/0341069 A1 * | 11/2018 | Takano | ............... | G02B 6/3888 |
| 2019/0391343 A1 * | 12/2019 | Aoshima | ............. | G02B 6/3879 |

* cited by examiner

*Primary Examiner* — Ryan A Lepisto
*Assistant Examiner* — Erin D Chiem
(74) *Attorney, Agent, or Firm* — Oliff PLC

(57) ABSTRACT

An optical connector including a ferrule, an outer housing, and a latch is disclosed. The ferrule holds an optical fiber at a front end of the optical connector. The outer housing is located closer to a rear end of the optical connector than the ferrule. The latch is connected to the outer housing and extends from a proximal end toward the front end of the optical connector. The latch includes an engaging part to engage with an external device at a distal end thereof. The latch is configured such that the engaging part is pushed down toward the ferrule. The engaging part includes an engaging main body and an engaging protrusion protruding outwardly from the engaging main body. The engaging protrusion includes an engaging surface to engage with the external device at a rear of the engaging protrusion, and an edge of the engaging surface is chamfered.

12 Claims, 17 Drawing Sheets

OPTICAL CONNECTOR

CROSS-REFERENCE TO RELATED APPLICATIONS

This application is a continuation-in-part of U.S. patent application Ser. No. 17/150,523, filed on Jan. 15, 2021. This application is based upon and claims the benefit of the priority from Japanese Patent Application No. 2021-086242, filed on May 21, 2021, and Japanese Patent Application No. 2020-026022, filed on Feb. 19, 2020, the entire contents of which are incorporated herein by reference.

TECHNICAL FIELD

The present disclosure is related to an optical connector.

BACKGROUND

US2018/0341069A discloses an optical connector. The optical connector includes a housing body having a pair of ferrule housings that house each ferrule therein, and a latch having a pair of engaging parts for engaging with an external device such as an adaptor.

SUMMARY

The present disclosure provides an optical connector including a front end and a rear end opposite to the front end along a first direction. The optical connector includes at least one ferrule, an outer housing, and a latch. The ferrule is configured to hold an optical fiber therein at the front end of the optical connector. The outer housing is located closer to the rear end of the optical connector than the ferrule. The latch is connected to the outer housing and extends along the first direction from a proximal end having a connecting part with the outer housing toward the front end of the optical connector. The latch includes at least one engaging part configured to engage with an external device at a distal end thereof. The latch is configured such that the engaging part is pushed down toward the ferrule along a second direction intersecting the first direction. The engaging part includes an engaging main body extending along the first direction and at least one engaging protrusion protruding outwardly from the engaging main body along a third direction intersecting both of the first direction and the second direction. The engaging protrusion includes an engaging surface configured to engage with the external device, at the rear of the engaging protrusion, and an edge of the engaging surface is chamfered.

BRIEF DESCRIPTION OF THE DRAWINGS

The foregoing and other purposes, aspects and advantages will be better understood from the following detailed description of embodiments of the disclosure with reference to the drawings, in which.

DETAILED DESCRIPTION

Figure 1:
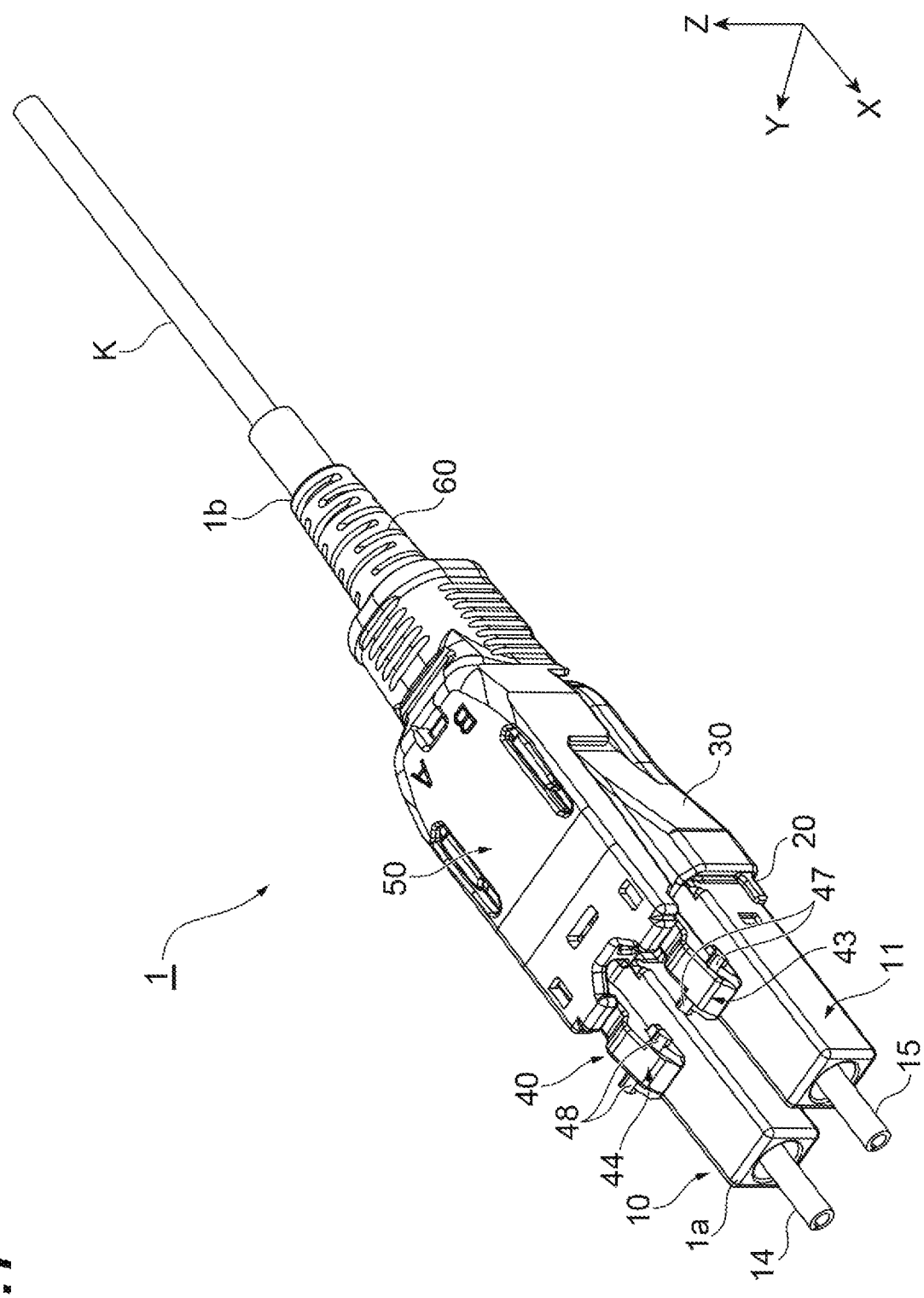
FIG. 1 is a perspective view illustrating an optical connector according to one embodiment.

Problem to be Solved by the Present Disclosure

The optical connector disclosed in US2018/0341069A is connected to the external device such as an adapter by engaging the pair of engaging parts of the latch with engaging parts of the external device when ferrules of the optical connector are inserted to the externa device. When the optical connector is released from the external device, the respective engaging parts of the latch are moved downwardly, thereby engagement with the engaging parts of the latch is released. However, it can be happened that some of the engaging parts of the optical connector is not properly released from the engaging parts of the adapter and is stuck to the adapter. Particularly, when the engaging parts of the optical connector are made of resin and the engaging parts of the external device are made of metal, some of the engaging parts of the optical connector is stuck to the engaging parts of the adapter not to pull out from the adapter. It is therefore desired to provide an optical connector that improves capability for inserting and removing the optical connector to/from an external device.

Effect of the Present Disclosure

According to the present disclosure, capability for inserting and removing an optical connector to/from an external device is improved.

Description of Embodiments of the Present Disclosure

Contents of embodiments of the present disclosure will be listed and described. An optical connector according to one embodiment includes a front end and a rear end opposite to the front end along a first direction. The optical connector includes at least one ferrule, an outer housing, and a latch. The ferrule is configured to hold an optical fiber therein at the front end of the optical connector. The outer housing is located closer to the rear end of the optical connector than the ferrule. The latch is connected to the outer housing and extends along the first direction from a proximal end having a connecting part with the outer housing toward the front end of the optical connector. The latch includes at least one engaging part configured to engage with an external device at a distal end thereof. The latch is configured such that the engaging part is pushed down toward the ferrule along a second direction intersecting the first direction. The engaging part includes an engaging main body extending along the first direction and at least one engaging protrusion protruding outwardly from the engaging main body along a third direction intersecting both of the first direction and the second direction. The engaging protrusion includes an engaging surface configured to engage with the external device, at the rear of the engaging protrusion, and an edge of the engaging surface is chamfered.

In the above optical connector, the edge of the engaging surface of the engaging protrusion of the latch, which is engaged with the external device, is chamfered. Since the engaging surface of this embodiment does not include in the edge a corner portion which is easily stuck to the engaging part of the external device, when the optical connector like this is pulled out from the external device and the latch is pushed down, engagement of the engaging part of the optical connector and an engaging part of the external device can be surely released. Accordingly, the optical connector of this embodiment can improve capability for inserting and removing the optical connector to/from the external device. Herein, the term of "a/the external device" includes at least an adapter which connects optical fibers with each other, and an optical transceiver to which the optical connector is connected.

As one embodiment, a chamfer dimension of the edge of the engaging surface may be equal to or less than 0.4 mm. In this embodiment, the engagement of the engaging surface with the external device can be surely performed while improving the capability for inserting and removing the optical connector to/from the external device.

As one embodiment, a chamfer dimension of the edge of the engaging surface may be equal to or less than half of a protruding length of the engaging protrusion along the third direction. In this embodiment, the engagement of the engaging surface with the external device can be surely performed while improving the capability for inserting and removing the optical connector to/from the external device.

As one embodiment, the edge of the engaging surface may be C chamfered or R-chamfered. In this embodiment, a chamfered shape of the edge of the engaging surface can be surely formed.

As one embodiment, the engaging protrusion may include a curved surface that is continuous with an upper edge of the engaging surface. The upper edge is opposite to the downward direction along the second direction. In this embodiment, when the optical connector is pulled out from the external device, pull-out operation of the optical connector after releasing the engaging surface of the optical connector from the engaging part of the external device, can be smoothly performed. In this embodiment, a part of an edge of the curved surface may be chamfered.

As one embodiment, the chamfered surface may include a pair of straight lines and two curved lines connecting the pair of straight lines with each other. In this embodiment, the engaging protrusion is provided with more curved portions and thus these portions can further prevent the engaging protrusion from being stuck with the external device.

As one embodiment, the engaging main body may include a first inclined surface located closer to the front end, and the second inclined surfaced that is connected to the first inclined surface and located closer to the rear end than the first inclined surface. In addition, the engaging protrusion may protrude outwardly along the third direction from a portion of the engaging main body where the second inclined surface is located when viewed from the second direction. In this embodiment, the engaging protrusion may include a third inclined surface located closer to the front end, and an inclination angle of the third inclined surface with respect to the first direction may be smaller than an inclination angle of the first inclined surface with respect to the first direction and may be larger than an inclination angle of the second inclined surface with respect to the first direction.

As one embodiment, the at least one engaging protrusion may include a first engaging protrusion protruding outwardly from the engaging main body along the third direction, and a second engaging protrusion protruding outwardly from the engaging main body along the third direction in a direction opposite to the first engaging protrusion. In this embodiment, one engaging part of the latch is provided with two engaging protrusions protruding in opposite directions each other and thus the engagement of the latch with the external device is performed in a fine balance along the third direction, which is a horizontal direction. Accordingly, the optical connector of this embodiment prevents from deviating in the third direction when engaging with the external device and/or releasing from the engaged external device and then the engaging and the releasing can be smoothly performed. Therefore, the capability for inserting and removing the optical connector to/from the external device can further improved.

As one embodiment, the latch may include a first latch member extending along the first direction from a first proximal end having a connecting part with the outer housing toward the front end of the optical connector, and a second latch member extending in parallel with the first latch member from a second proximal end having a connecting part with the outer housing toward the front end of the optical connector. The engaging part may be provided with each distal end of the first latch member and the second latch member.

As one embodiment, the optical connector may further include a housing body and tab. The housing body may be configured to house the ferrule therein such that a tip end of the ferrule is exposed at the front end of the optical connector. The housing body may be connected to the outer housing. The tab may be placed on an outer side of the latch to cover at least a part of the latch and may be connected to the outer housing to be movable along the first direction with respect to the outer housing. The tab may be configured to push down the engaging part of the latch toward the housing body according to movement of the tab along the first direction from the front end toward the rear end. The distal end of the latch may float to space apart from the housing body. The tab may include at least one protrusion disposed on an inner side of the tab between the front end of the optical connector and the proximal end of the latch. The optical connector may be configured to contact an inner side of the latch with the protrusion to push down the engaging part toward the housing body with the protrusion as a fulcrum when the engaging part of the latch is engaged with the external device.

In the above optical connector, the distal end at which the engaging part of the latch is provided floats to spaced apart from the housing body in the normal state. Thus, a region corresponding to a distal end of a conventional latch can be reduced in size to achieve weight reduction of the optical connector. In addition, the protrusion is disposed on the inner side of the tab between the front end of the optical connector and the proximal end of the latch in this optical connector, and the inner side of the latch comes into contact with the protrusion and the engaging part of the latch is pushed down toward the housing body with the protrusion as a fulcrum when the engaging part of the latch is engaged with the external device. According to this configuration, when the engaging part of the latch is engaged with the external device, the latch can be deformed toward the housing body with the protrusion disposed close to the distal end of the latch with respect to the proximal end thereof as a fulcrum, rather than deforming the latch toward the housing body with the proximal end as a fulcrum. As a result, a deformation distance from the fulcrum decreases, and thus an elastic force of the deformed latch (engaging part) increases and a click feeling when the engaging part of the latch is engaged with the external device can be improved. According to the above optical connector, it is possible to achieve weight reduction of the optical connector and provide a desired click feeling to a user when it is attached to the external device. The term of "normal state" described herein means a state in which the latch is not engaged with an external device including a state before the optical connector is attached to an external device such as an adaptor or a state after the optical connector is detached from an external device.

Description of Embodiment of Present Disclosure

Specific examples of embodiments of the present disclosure will be described below with reference to the drawings. The present invention is not limited to these examples and is defined by the scope of the claims, and meanings equivalent to the scope of the claims and all modifications are intended to be included within the scope. In the following description, the same reference numbers are assigned to the same elements in the description of the drawings, and redundant description thereof will be omitted.

FIG. 1 is a perspective view illustrating an optical connector according to one embodiment. As illustrated in FIG. 1, an optical connector 1 has a shape laterally elongated in a longitudinal direction X (first direction) and includes a front end 1a and a rear end 1b. The rear end 1b is positioned opposite to the front end 1a in the longitudinal direction X. An optical cable K held by the optical connector 1 is inserted from the rear end 1b into the optical connector 1. In the optical connector 1, a pair of optical fibers enclosed in the optical cable K are housed and held in a pair of ferrules 14 and 15 with coating resins thereof removed. The optical connector 1 may be, for example, a duplex LC connector and an optical connector of a uniboot type. The optical connector 1 can be a connector with another configuration.

Figure 2:
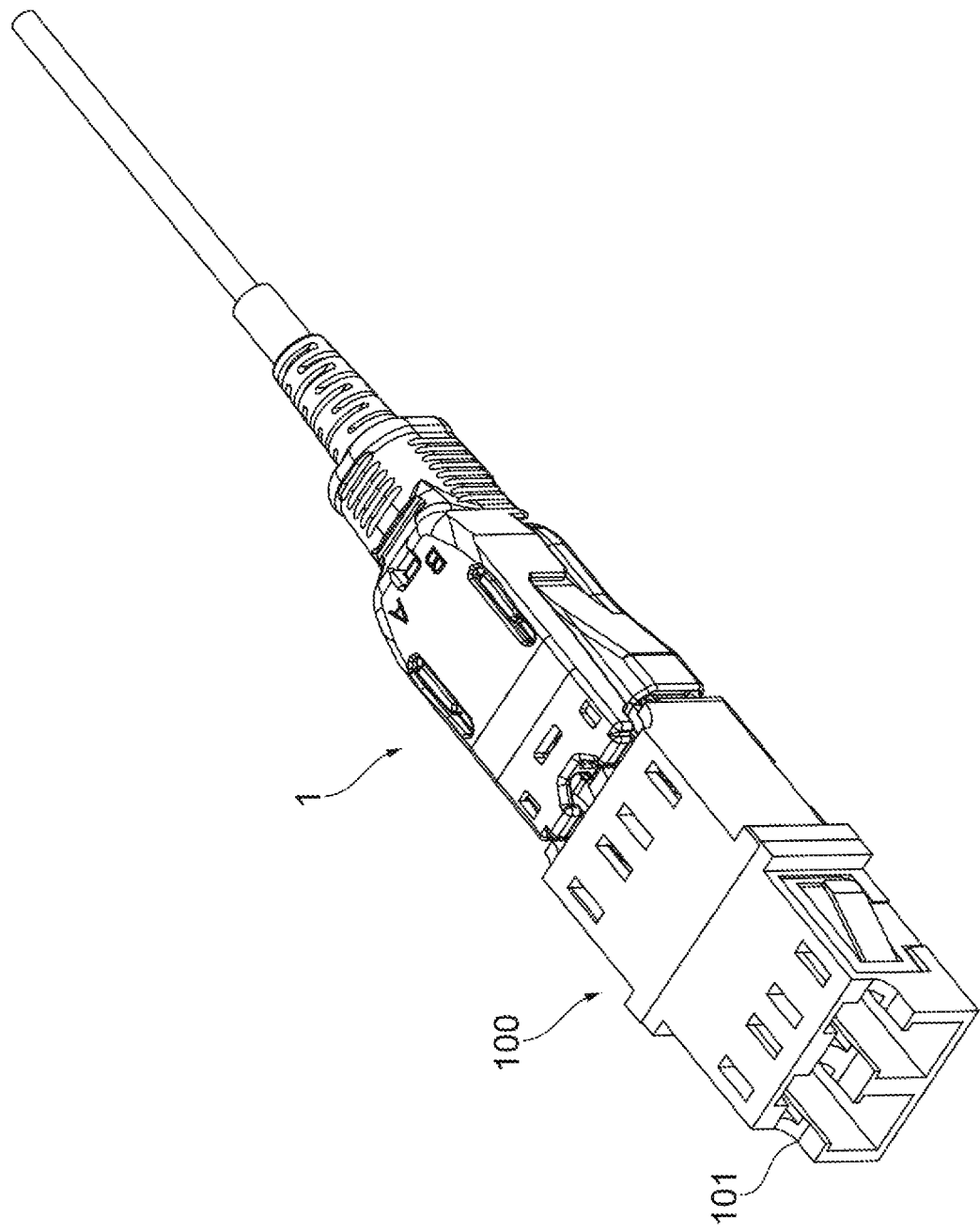
FIG. 2 is a perspective view illustrating a state in which the optical connector illustrated in FIG. 1 is coupled to an adaptor.

FIG. 2 is a view illustrating a state in which the optical connector 1 is inserted into an adaptor 100, which is an external device. As illustrated in FIGS. 1 and 2, engaging parts 43 and 44 provided at a distal end of a latch 40 (details will be described below) engage with engaging parts 103 and 104 provided in the adaptor 100, and then the optical connector 1 is housed in a predetermined position in the adaptor 100 and locked to the adaptor 100. Another optical connector is inserted into a mounting port 101 of the adaptor 100 opposite to the optical connector 1, and the optical connector 1 is optically coupled to another optical connector by the adaptor 100. Another optical connector may have a same configuration as the optical connector 1 or have a different configuration. The optical connector 1 may be configured to be inserted into a connecting part of an optical transceiver serving as an external device.

Figure 3:
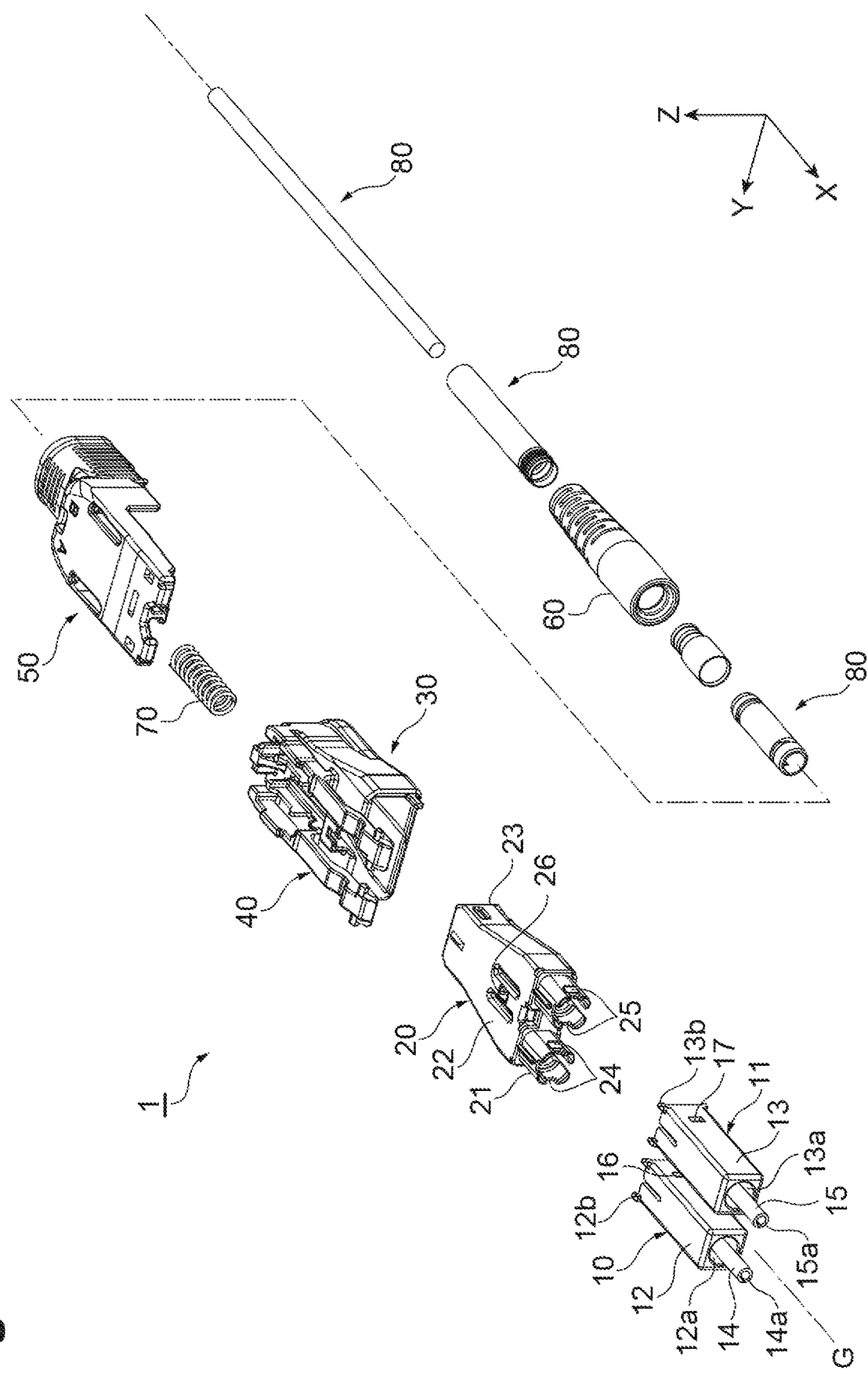
FIG. 3 is an exploded perspective view of the optical connector illustrated in FIG. 1.

FIG. 3 is an exploded perspective view of the optical connector 1 illustrated in FIG. 1. As illustrated in FIGS. 1 and 3, the optical connector 1 includes a pair of front housings 10 and 11, an inner housing 20, an outer housing 30, the latch 40, a tab 50, a boot 60, an elastic member 70, and cable holding members 80. In the present embodiment, a housing body M (see FIG. 7) may be constituted by the pair of front housings 10 and 11 and the inner housing 20. The housing body M is housed in the outer housing 30.

Figure 7:
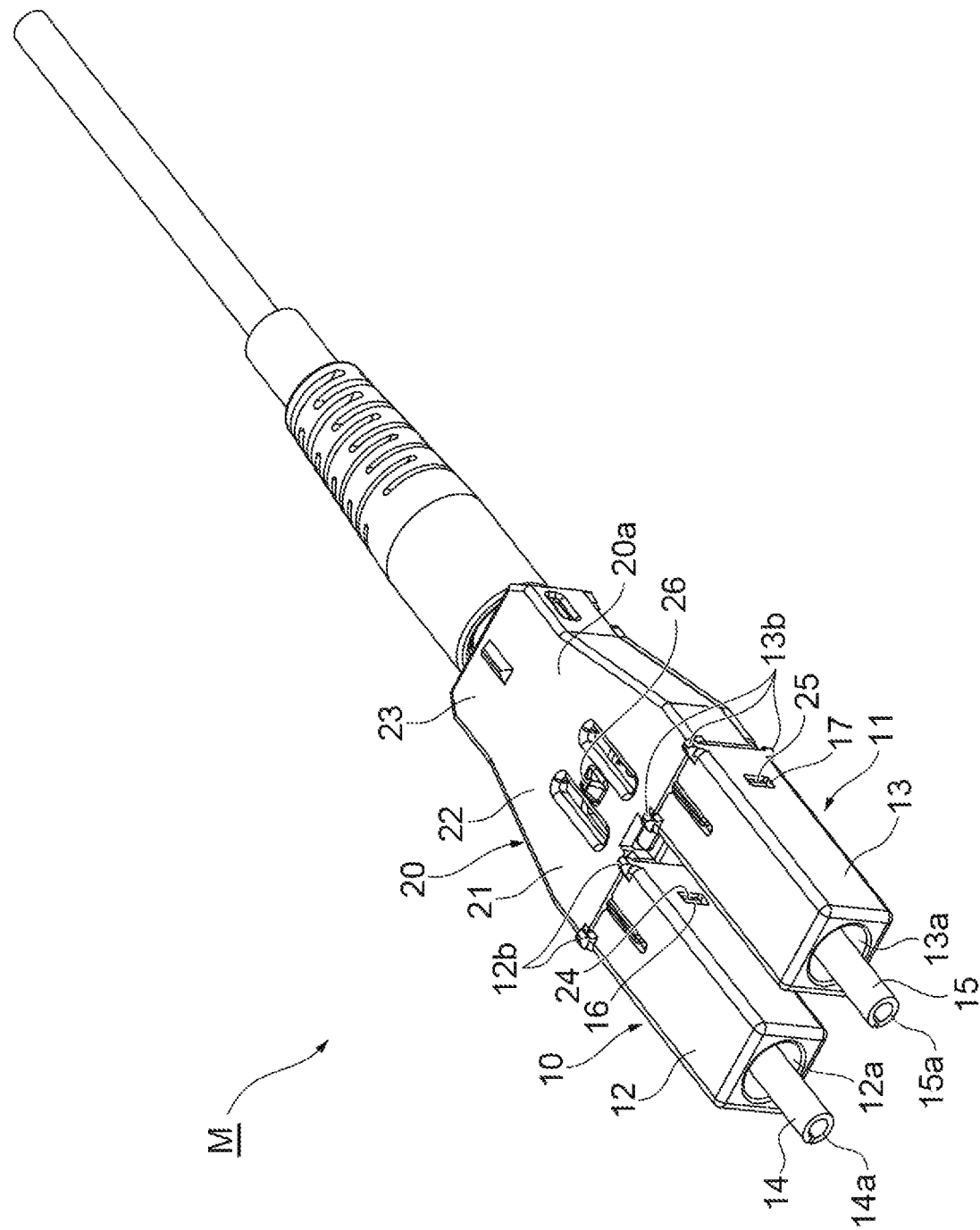
FIG. 7 is a perspective view illustrating a housing body which constitutes a part of the optical connector.

The front housing 10 includes a main body 12 and a ferrule 14, and the front housing 11 includes a main body 13 and a ferrule 15 (see also FIG. 7). The main bodies 12 and 13 are formed of a synthetic resin and have an outer shape of a square column in which round holes 12a and 13a are provided, respectively. The main body 12 houses the ferrule 14 that holds one optical fiber in the round holes 12a so that distal ends 14a of the ferrule 14 is exposed to the outside at the front end 1a of the optical connector 1. The main body 13 houses the ferrule 15 that holds another optical fiber in the round holes 13a so that distal ends 15a of the ferrule 15 is exposed to the outside at the front end 1a of the optical connector 1. Distal ends of the held optical fibers are exposed from the distal ends 14a and 15a of the ferrules 14 and 15, respectively. The distal ends 14a and 15a of the ferrules 14 and 15 may be surfaces parallel to a vertical direction Z (second direction) perpendicular to (intersecting) the longitudinal direction X or may be inclined surfaces to the vertical direction Z. Four protrusions 12b and four protrusion 13b are provided at four corners of each of rear ends of the main bodies 12 and 13. The protrusions 12b and 13b define a mutual positional relationship when the front housings 10 and 11 are connected to a front end of the inner housing 20. A pair of openings 16 having a rectangular shape are provided on both lateral surfaces of the front housing 10, and a pair of openings 17 having a rectangular shape are provided on both lateral surfaces of the front housing 11.

The inner housing 20 is a housing in which a space is formed to house optical fibers therein and is formed of a synthetic resin. The inner housing 20 includes a front end portion 21, a tapered portion 22, and a rear end portion 23, and is formed so that an internal space thereof gradually enlarges from the rear end toward the front end. The inner housing 20 is a member for branching the pair of optical fibers enclosed in the optical cable K into the ferrules 14 and 15 and is connected to rear ends of the pair of front housings 10 and 11. A pair of latches 24 and a pair of latches 25 are provided in the front end portion 21 of the inner housing 20. The pair of latches 24 are inserted into and engaged with the pair of openings 16 of the front housing 10 from the inside, and the pair of latches 25 are inserted into and engaged with the pair of openings 17 of the front housing 11 from the inside. Thereby, the pair of front housings 10 and 11 are connected to the inner housing 20. In addition, protrusions 26 are provided on the inner housing 20 near the front end portion 21 and at centers of a front surface 20a and a rear surface, respectively (see FIG. 7). When the inner housing 20 is housed in the outer housing 30, either one of the protrusions 26 engages with a hole provided in a lower surface 30b of the outer housing 30, and thereby the inner housing 20 is detachably connected to the inside of the outer housing 30. Each of the protrusions 26 has an inclined surface to be attachable and detachable.

Figure 4:
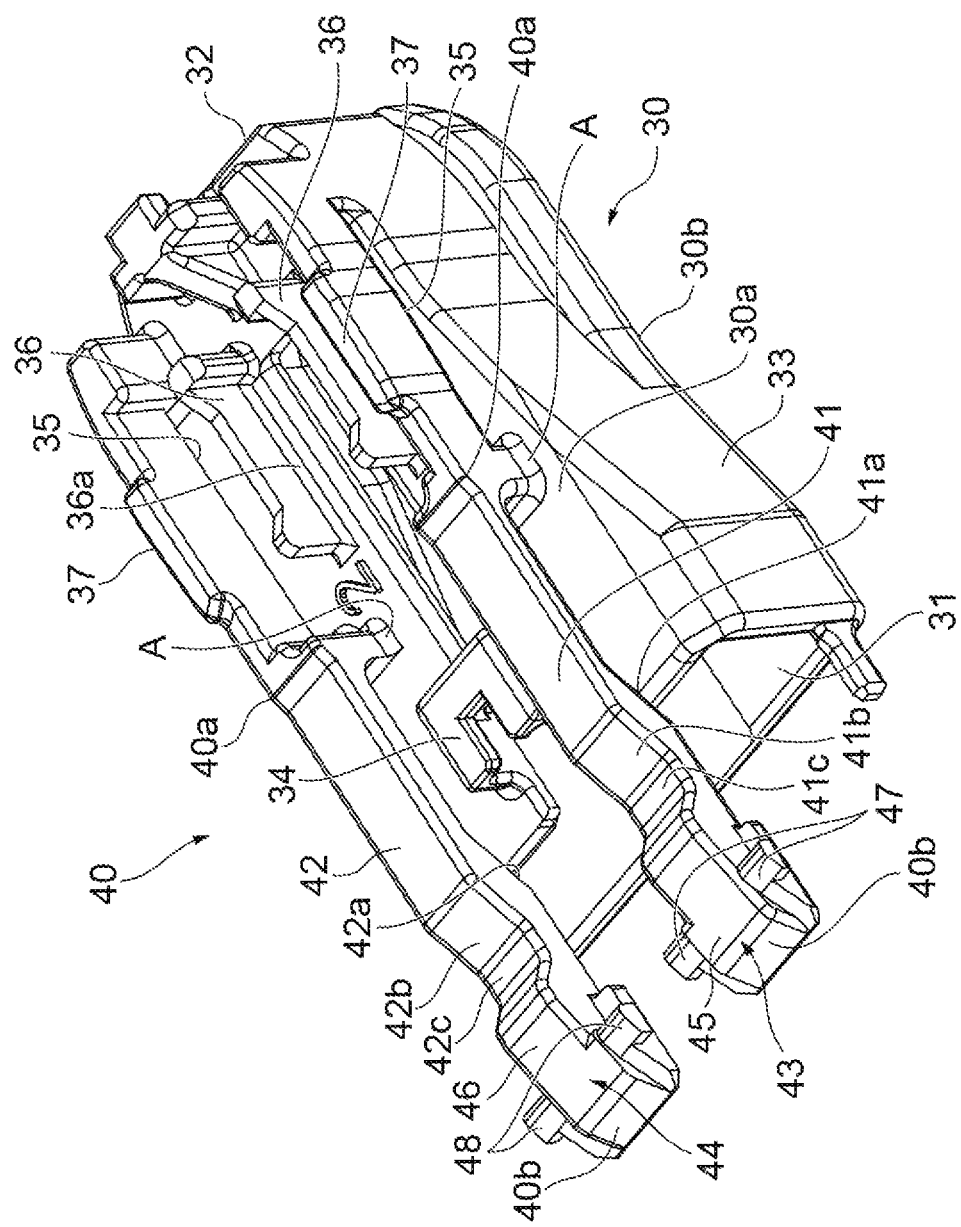
FIG. 4 is a perspective view illustrating an outer housing with a latch attached which is one component of the optical connector.

The outer housing 30 is a housing that houses the inner housing 20 therein to be connected to the inner housing 20. FIG. 4 is a perspective view illustrating the outer housing 30. As illustrated in FIG. 4, the outer housing 30 of the present embodiment is formed of a synthetic resin to be integrated with the latch 40 to be described below. The outer housing 30 and the latch 40 may be formed as separate bodies and connected to each other by a method, such as adhesion, fitting, or the like, as an example. In FIG. 4, the latch 40 is connected to the outer housing 30 at a pair of connecting parts A. As illustrated in FIG. 4, the outer housing 30 includes a housing body 33 having openings 31 and 32 at the front and the rear, respectively.

A pair of walls 36 defining a portion 36a for housing the elastic member 70 therein and a pair of guide protrusions 37 positioned on respective outer sides of the respective walls 36 are provided on an upper surface 30a of the outer housing 30. The elastic member 70 housed in the portion 36a is disposed between the outer housing 30 and the tab 50 to be described below (see FIG. 11) and functions to return the tab 50 to a normal position when the tab 50 moves toward the rear end 1b with respect to the outer housing 30. The elastic member 70 may be, for example, a spring. The pair of guide protrusions 37 are positioned in a pair of slits 55 and 56 of the tab 50, respectively when the tab 50 is connected to the outer housing 30 to guide movement of the tab 50 in the longitudinal direction X. The outer housing 30 further includes, as a structure connecting to the tab 50, a protruding part 34 provided on a front side and a pair of slits 35 for connection provided on a lower side of each of the guide protrusions 37. The hole and an opening are provided in the lower surface 30b of the outer housing 30. One of the protrusions 26 of the inner housing 20 enters the hole 38, and thereby the inner housing 20 is detachably connected to the outer housing 30.

The latch 40 is a member that is provided on an outer side of the outer housing 30. The latch 40 includes elongate members 41 and 42 each extending along the longitudinal direction X from each proximal end 40a (first proximal end, second proximal end) having the connecting part A toward the front end 1a. The elongate member 41 includes the engaging part 43, and the elongate member 42 includes the engaging part 44. Both of the engaging parts 43 and 44 are engageable with an external device such as the adaptor 100 at distal end portions 40b thereof. The engaging part 43 includes an engaging main body 45 extending along the longitudinal direction X, and a pair of engaging protrusions 47 each protruding from the main body 45 in an outward direction along a lateral direction Y perpendicular to the longitudinal direction X. The engaging part 44 includes an engaging main body 46 extending along the longitudinal direction X, and a pair of engaging protrusions 48 each protruding from the main body 46 in an outward direction along the lateral direction Y. When these engaging protrusions 47 and 48 of the engaging parts 43 and 44 are engaged with engaging parts 103 and 104 in the adaptor 100, the optical connector 1 is attached to the adaptor 100. The distal ends 40b of the latch 40, that is, the engaging parts 43 and 44, are in a state of floating to space apart from the front housings 10 and 11 in a normal state. Detailed construction of the engaging parts 43 and 44 and the engaging parts 103 and 104 will be described later.

Figure 8:
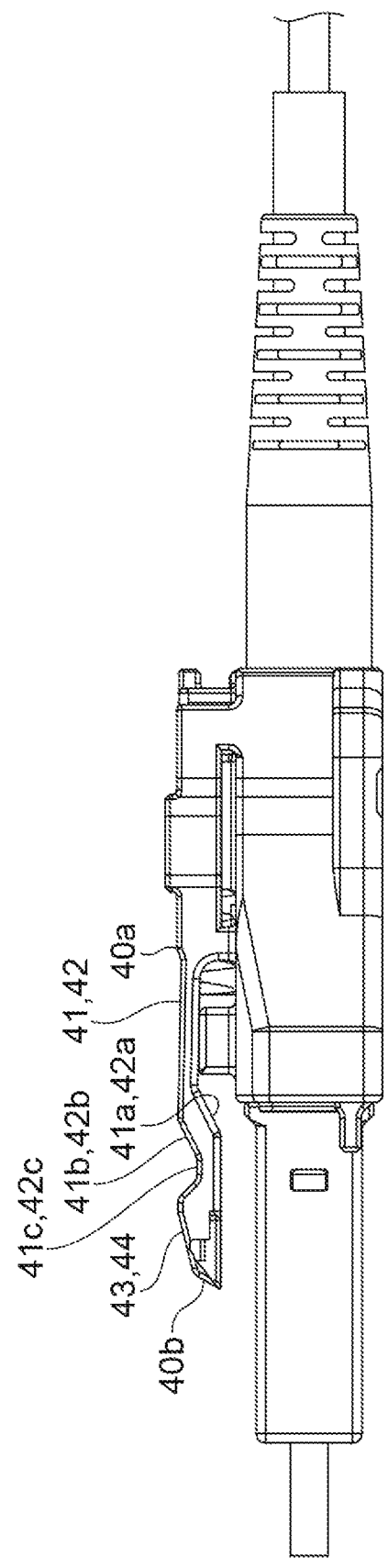
FIG. 8 is a side view of a configuration of the optical connector in which the tab is removed from the optical connector.

Inclined surfaces 41a and 42a, inclined surfaces 41b and 42b, and recesses 41c and 42c are provided in the elongate members 41 and 42 of the latch 40 in the vicinity of centers thereof (see also FIG. 8). The inclined surfaces 41a and 42a are provided on an inner side of the latch 40. The inclined surfaces 41b and 42b are provided on an outer side of the latch 40 and form a part of the recesses 41c and 42c, respectively. The elongate members 41 and 42 of the latch 40 may be formed to have the same thickness throughout, or a plate thickness of the proximal end 40a may be thinner than a plate thickness at a region in which the inclined surfaces 41a and 42a or the inclined surface 41b and 42b are positioned. In this case, movement of the distal ends 40b of the latch 40, that is, the engaging parts 43 and 44, in the vertical direction with the respective proximal ends 40a as respective fulcrums becomes smoother. The term of "plate thickness" mentioned herein means a thickness in a direction perpendicular to a surface at each portion.

Figure 5:
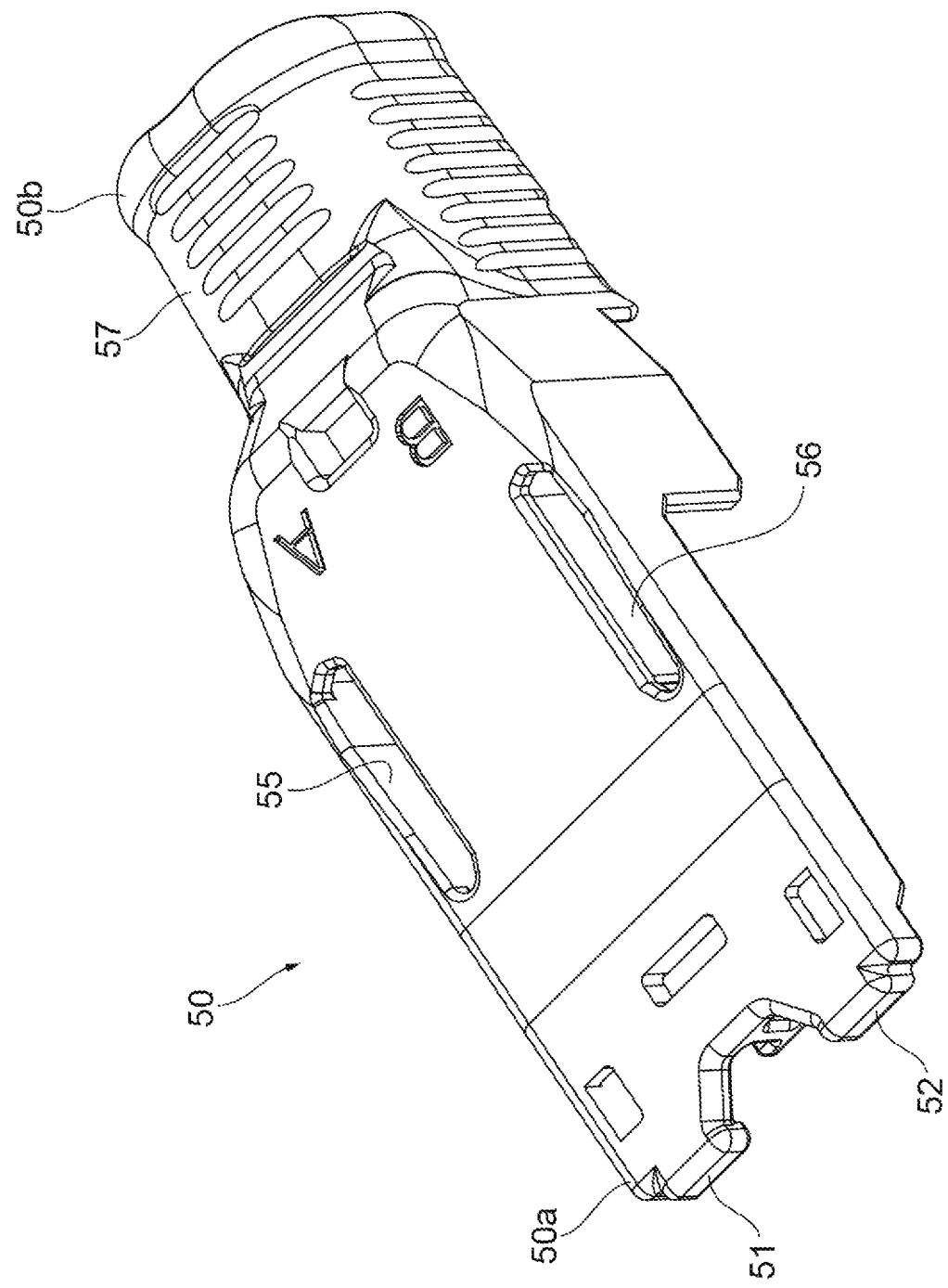
FIG. 5 is a perspective view illustrating a tab which is one component of the optical connector.
Figure 6:
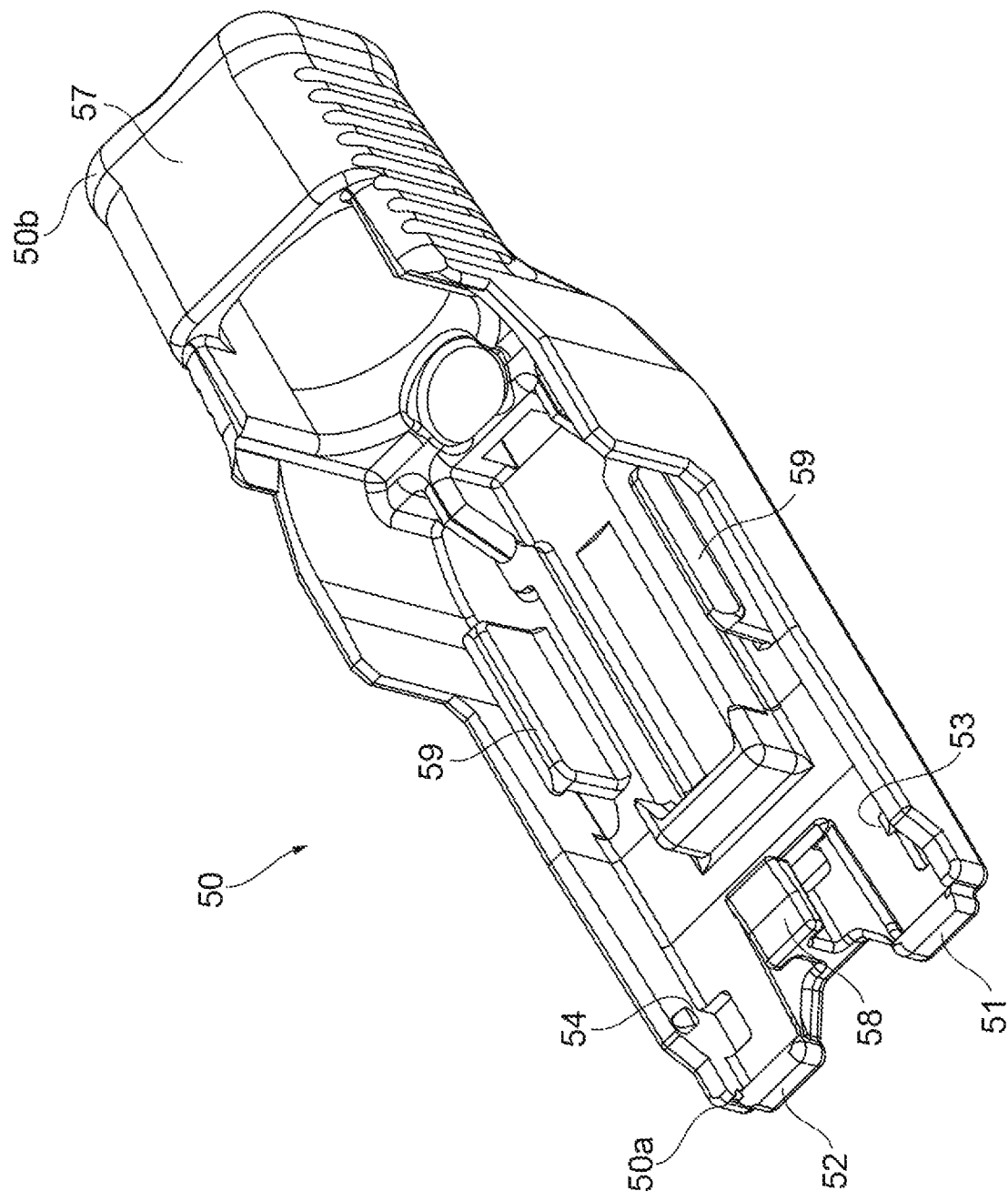
FIG. 6 is a perspective view of the tab illustrated in FIG. 5 from the opposite side.

The tab 50 is disposed on an outer side of the latch 40 to cover a portion of the latch 40 excluding the engaging parts 43 and 44 located at the distal end 40b. FIG. 5 is a perspective view illustrating the tab 50 from one side, and FIG. 6 is a perspective view illustrating the tab 50 from the other side. As illustrated in FIGS. 3, 4, 5 and 6, a protruding part 58 on an inner side of a front end 50a of the tab 50 is connected to the protruding part 34 on the upper surface 30a of the outer housing 30, and a pair of left and right latches 59 on an inner side of the tab 50 are caught by the left and right slits 35 of the upper surface 30a of the outer housing 30 from the inside. Thereby, the tab 50 is connected to the outer housing 30 to be movable in the longitudinal direction X with respect to the outer housing 30. The tab 50 is configured to push down the engaging parts 43 and 44 of the latch 40 toward the front housings 10 and 11 in the vertical direction Z (second direction) perpendicular to (intersecting) the longitudinal direction X according to movement thereof in the longitudinal direction X from the front end 1a toward the rear end 1b. More specifically, protrusions 51 and 52 protruding downward are provided at the front end 50a of the tab 50, the protrusions 51 and 52 move rearward along the inclined surfaces 41b and 42b of the latch 40 when the tab 50 moves rearward, and thereby the engaging parts 43 and 44 of the latch 40 are pushed downward for releasing the optical connector 1 from the adapter 100.

A pair of protrusions 53 and 54 are further provided on an inner side of the tab 50. The protrusions 53 and 54 are provided at positions at which they are almost, but not in contact with the inner side of the latch 40 in the normal state. However, the protrusions 53 and 54 are configured to come into contact with the inner side of the latch 40 when the engaging parts 43 and 44 of the latch 40 move slightly downward at the time of the optical connector 1 being attached to the adaptor 100, that is, at the time of the engaging parts 43 and 44 of the latch 40 being engaged with an engaging part of the adaptor 100. Then, the latch 40 is configured such that the engaging parts 43 and 44 are pushed down toward the front housings 10 and 11 with contact points of the latch 40 with the protrusions 53 and 54 as respective fulcrums.

The pair of slits 55 and 56 are provided in a central portion of the tab 50. The pair of guide protrusions 37 of the outer housing 30 described above are disposed in the slits 55 and 56, respectively. When the pair of guide protrusions 37 slide in the slits 55 and 56, movement of the tab 50 in the longitudinal direction X is guided. A grip part 57 is provided at a rear end 50b of the tab 50. When the optical connector 1 attached to the adaptor 100 is detached from the adaptor 100, a user grips the grip part 57 and pulls the tab 50 rearward, and thereby the protrusions 51 and 52 perform the above-described operation and engagement of the latch 40 is released. The grip part 57 in the present embodiment has a cylindrical shape that makes one revolution so that the user can grip in both the vertical direction and the lateral direction, but the grip part 57 may have a configuration in which it can be gripped in at least one of the vertical direction and the lateral direction. The boot 60 to be described below is housed inside the grip part 57.

The boot 60 and the cable holding members 80 are members for introducing the optical cable K into the optical connector 1 and fixing the optical cable K at a predetermined position in the optical connector 1. A part of the boot 60 and the cable holding members 80 are housed inside the outer housing 30 or the like.

Figure 9:
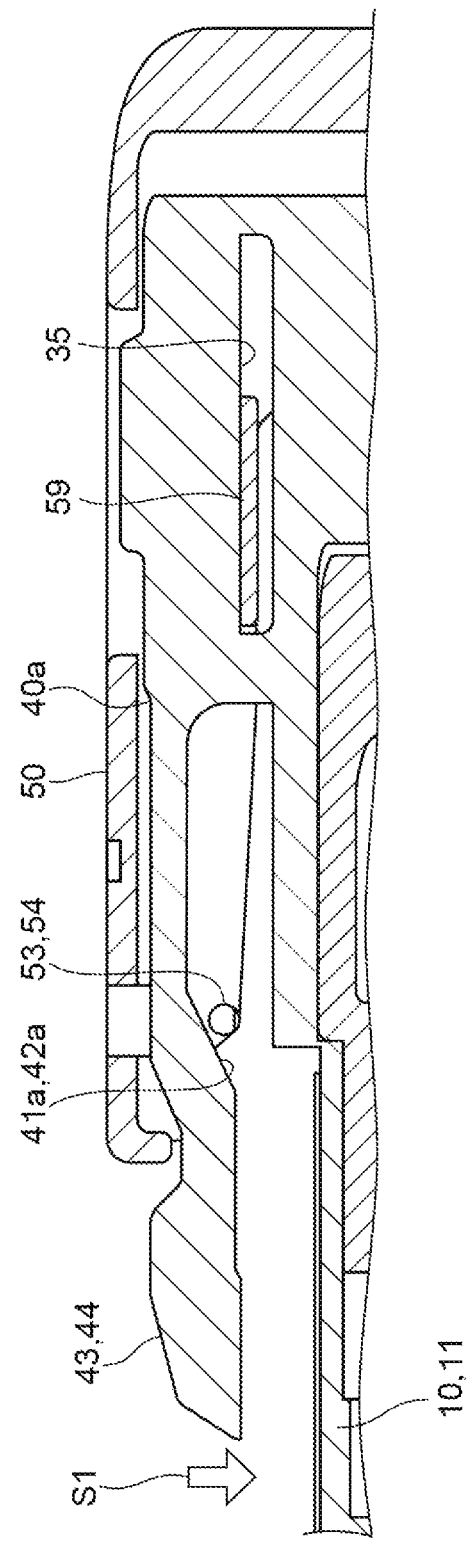
FIG. 9 is an enlarged cross-sectional view of an upper portion of the optical connector and is a cross-sectional view illustrating an operation when the optical connector is inserted into the adaptor.

Next, an operation of the optical connector 1 having the above-described configuration when the optical connector 1 is attached to the adaptor 100 will be described with reference to FIGS. 8 and 9. FIG. 8 is a side view of a configuration of the optical connector 1 in which the tab 50 is removed from the optical connector 1. FIG. 9 is an enlarged cross-sectional view of an upper portion of the optical connector 1 and is a cross-sectional view illustrating an internal operation when the optical connector 1 is inserted into the adaptor 100. As illustrated in FIGS. 8 and 9, in the optical connector 1 in the normal state before being attached to the adaptor 100, the protrusions 53 and 54 provided inside the tab 50 are positioned slightly away from the inclined surfaces 41a and 42a of the latch 40. When the optical connector 1 is inserted into the adaptor 100, the engaging parts 43 and 44 are slightly pushed down by the engaging part of the adaptor 100 in a direction of arrow S1. A fulcrum of an operation of the latch 40 at this time is positioned at the proximal end 40a. This operation causes the inclined surfaces 41a and 42a of the latch 40 to come into contact with the protrusions 53 and 54.

Thereafter, when the engaging parts 43 and 44 are pushed further downward (in the direction of arrow S1) by the engaging parts 103 and 104 of the adaptor 100 (see FIG. 14 and FIG. 16), the latch 40 (the engaging parts 43 and 44) is pushed downward with its contact points with the protrusions 53 and 54 as respective fulcrums. That is, the fulcrum has moved to a position closer to a point at which a load is applied to the latch 40. Thus, the latch 40 is deformed with this near fulcrum as a center, and an elastic force of the latch 40 that has become stronger is fed back to the user. As a result, a click feeling can be improved when the optical connector 1 is inserted into the adaptor 100 and engagement of the engaging parts are completed with each other.

Figure 10:
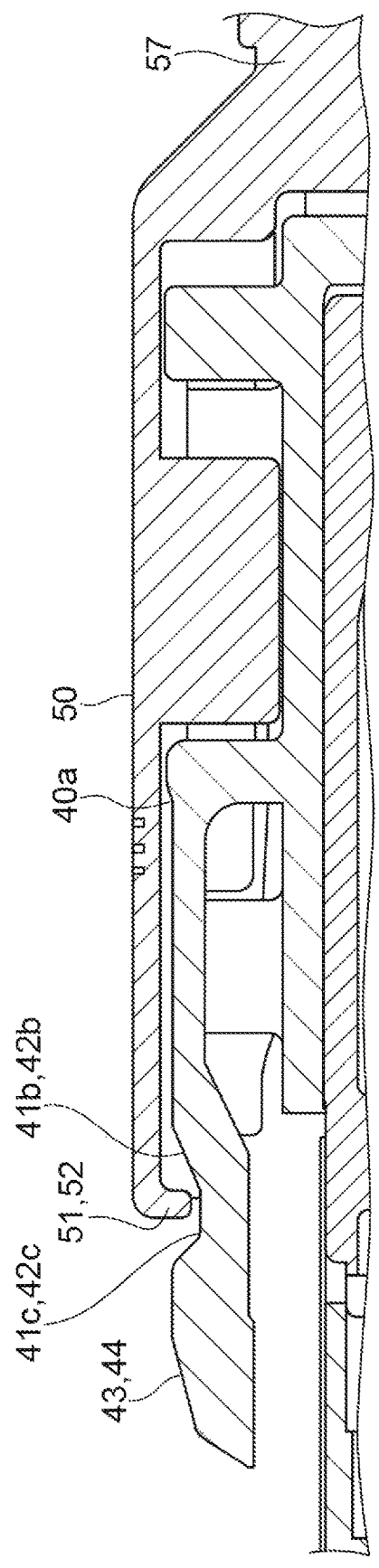
FIG. 10 is an enlarged cross-sectional view of the upper portion of the optical connector.
Figure 11:
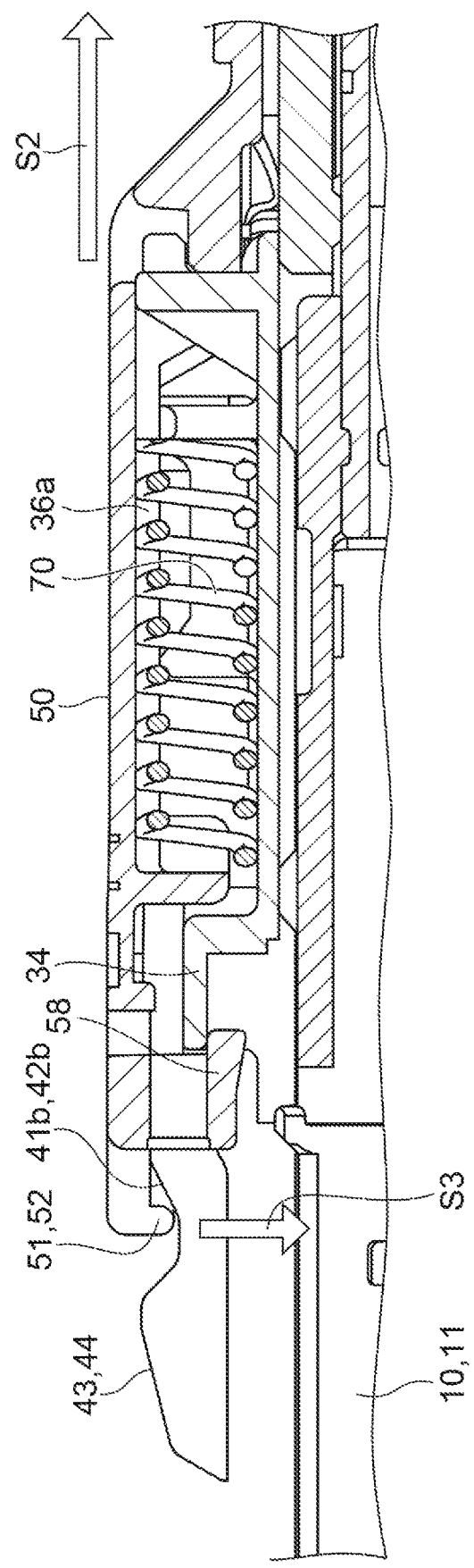
FIG. 11 is an enlarged cross-sectional view of the upper portion of the optical connector and is a cross-sectional view illustrating an operation when the optical connector is pulled out from the adaptor.

Next, an operation when the optical connector 1 is detached from the adaptor 100 will be described with reference to FIGS. 10 and 11. FIG. 10 is an enlarged cross-sectional view of the upper portion of the optical connector 1 and illustrates a state of being attached to the adaptor 100, in which the adapter is removed. FIG. 11 is a cross-sectional view illustrating an operation when the optical connector 1 is pulled out from the adaptor 100. As illustrated in FIGS. 10 and 11, when the optical connector 1 is detached from the adaptor 100, the user grips the grip part 57 of the tab 50 and pulls the tab 50 in a direction of arrow S2 (rearward). Due to this operation, the tab 50 moves rearward, and the protrusions 51 and 52 at a distal end of the tab 50 come into contact with the inclined surfaces 41b and 42b of the latch 40, move rearward along the inclined surfaces 41b and 42b, and push the engaging parts 43 and 44 downward, that is, in a direction toward the front housings 10 and 11 (direction of arrow S3). As a result, the optical connector 1 is pulled out from the adaptor 100. At this time, the latch 40 performs the operation with the proximal end 40a as a fulcrum. The tab 50 that has moved rearward is automatically returned to an initial position which is the normal state by the spring which is the elastic member 70 disposed between the outer housing 30 and the tab 50.

Figure 12:
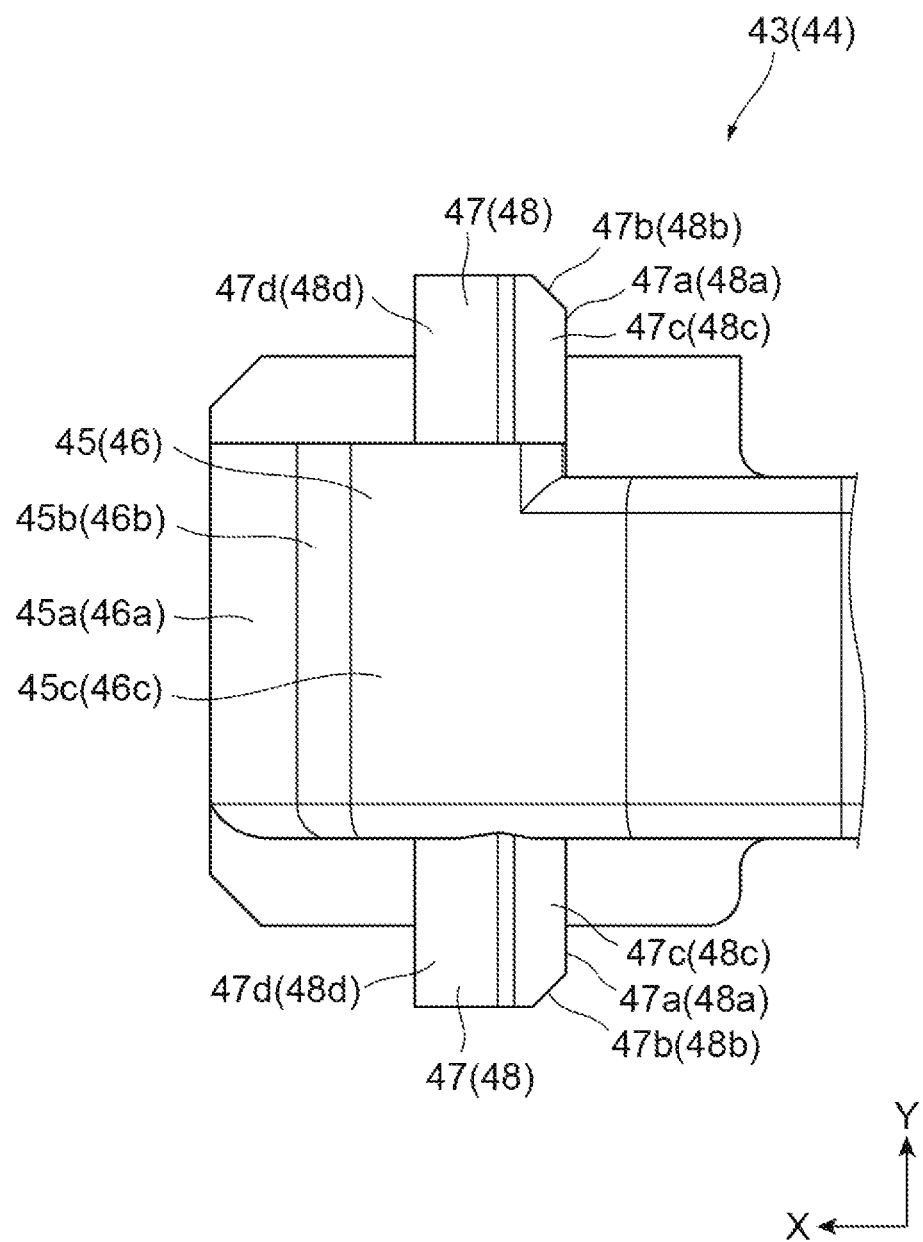
FIG. 12 is an enlarged plan view of an engaging part of the latch.
Figure 13:
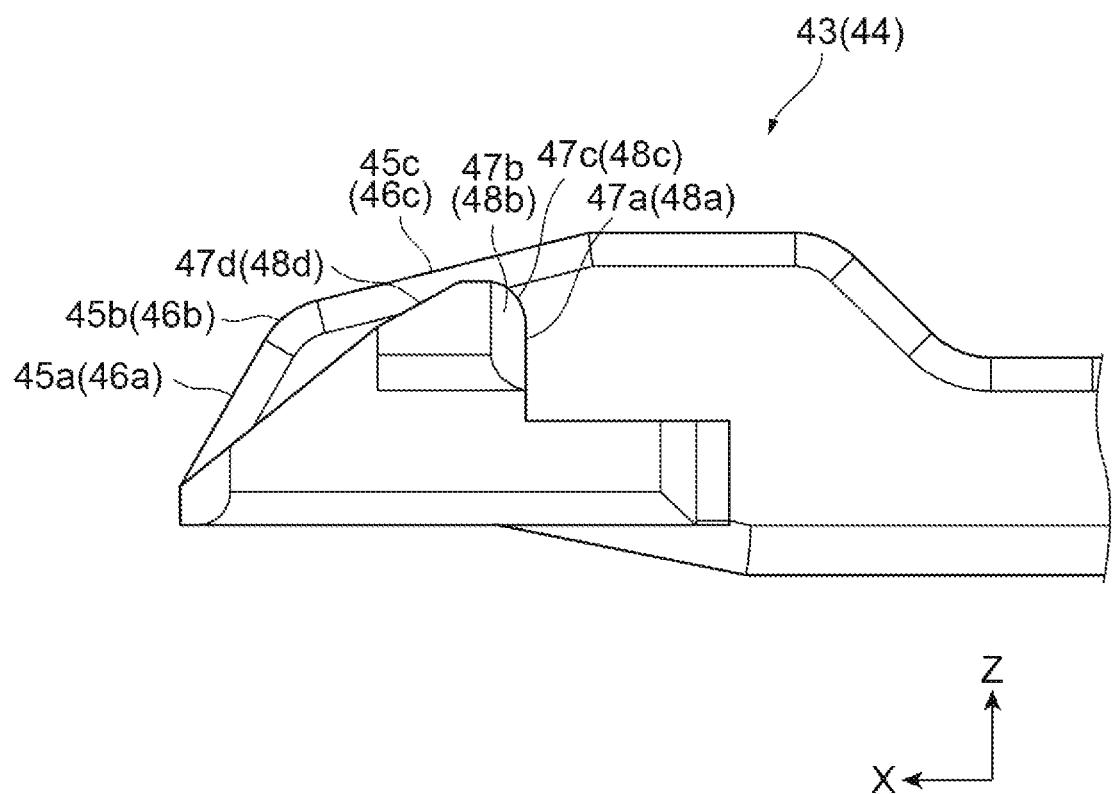
FIG. 13 is a side view of the engaging part of the latch when viewed from a side thereof.

The optical connector 1, which performs the above described inserting and removing, includes the latch 40 having a configuration which can provide the smoother removing from the adapter 100. A configuration of the engaging parts 43 and 44 of the latch 40 of the optical connector 1 and the engagement configuration of the engaging parts 43 and 44 of the optical connector 1 and the adapter 100 will be described below more in detail. FIG. 12 is an enlarged plan view of an engaging part 43 of the latch 40. FIG. 13 is a side view of the engaging part 43 of the latch 40 when viewed from a side thereof.

As illustrated in FIGS. 12 and 13, the engaging part 43 of the latch 40 includes the engaging main body 45 and the pair of engaging protrusions 47. The engaging main body 45 is a portion extending along the longitudinal direction X. An inclined surface 45a (first inclined surface) is provided closer to the front end 10a in the engaging main body 45, and an inclined surface 45c (second inclined surface) connected to the inclined surface 45a via a curved surface 45b is provided above the engaging part 43. The inclined surface 45c is located closer to the rear end 10b than the inclined surface 45a, and has a smaller (gentler) inclination angle with respect to a horizontal plane extending along the longitudinal direction X and the lateral direction Y than the inclined surface 45a.

The pair of engaging protrusions 47 are portions for engaging with the engaging part 103 of the adapter 100 and attaching the optical connector 1 to the adapter 100. The respective engaging protrusions 47 are configured to protrude outward from the engaging main body 45 in opposite directions along the lateral direction Y. More specifically, each engaging protrusion 47 protrudes outward along the lateral direction Y from a portion of the engaging main body 45 where the inclined surface 45c is located. Each engaging projection 47 has an engaging surface 47a that comes into surface contact with an engaging surface 105 (see FIG. 14) of the engaging part 103 of the adapter 100 when attached to the adapter 100, a chamfered surface 47b provided at an outer edge of the engaging surface 47a, a curved surface 47c continuous with an upper edge of the engaging surface 47a, and an inclined surface 47d (third inclined surface) connected to the curved surface 47c and inclined downward toward the front end 10a. The engaging surface 47a is a surface extending along the lateral direction Y and the vertical direction Z. The inclination angle of the inclined surface 47d with respect to the horizontal plane (the plane extending in the longitudinal direction X and the lateral direction Y) may be smaller than the inclination angle of the inclined surface 45a of the engaging main body 45 with respect to the horizontal plane and larger than the inclination angle of the inclined surface 45c with respect to the horizontal direction.

The chamfered surface 47b provided at the outer edge of the engaging surface 47a of the engaging protrusion 47 is, for example, a surface inclined at a predetermined angle, for example, 30 degrees or more and 60 degrees or less (45 degrees in the present embodiment as an example) with respect to the spreading direction of the engaging surface 47a (the plane defined by the lateral direction Y and the vertical direction Z). The chamfer dimension of the chamfered surface 47b is not limited, but may be equal to or less than a half of the protruding length (for example, about 1 mm) of each engaging protrusion 47 from the engaging main body 45, and can be, for example, equal to or less than 0.4 mm. The chamfer dimension of the chamfered surface 47b may be 0.3 mm or less, 0.2 mm or less, or 0.1 mm or more. As illustrate in FIG. 13, such a chamfer surface 47b may be a surface defined by, for example, a pair of straight lines and two curved lines connecting the pair of straight lines with each other.

As illustrate in FIG. 4, the other engaging part 44 of the latch 40 has a shape line-symmetric to the engaging part 43 with respect to a center line passing through the center of the optical connector 1 in the lateral direction Y and extending along the longitudinal direction X. The engaging part 44 includes the engaging main body 46 and the pair of engaging protrusions 48. As illustrated in FIGS. 12 and 13, the engaging main body 46 includes an inclined surface 46a (first inclined surface), a curved surface 46b, and an inclined surface 46c (second inclined surface) similarly to the engaging main body 45. Similarly to the engaging protrusion 47, each engaging protrusion 48 includes an engaging surface 48a, a chamfered surface 48b, a curved surface 48c, and an inclined surface 48d (third inclined surface). The latch 40 having such a configuration may be made of a resin material having good slidability. As the resin material, for example, polyetherimide (PEI), polyoxymethylene or polyacetal (POM), polyethersulfone (PES), or the like can be used.

Figure 14:
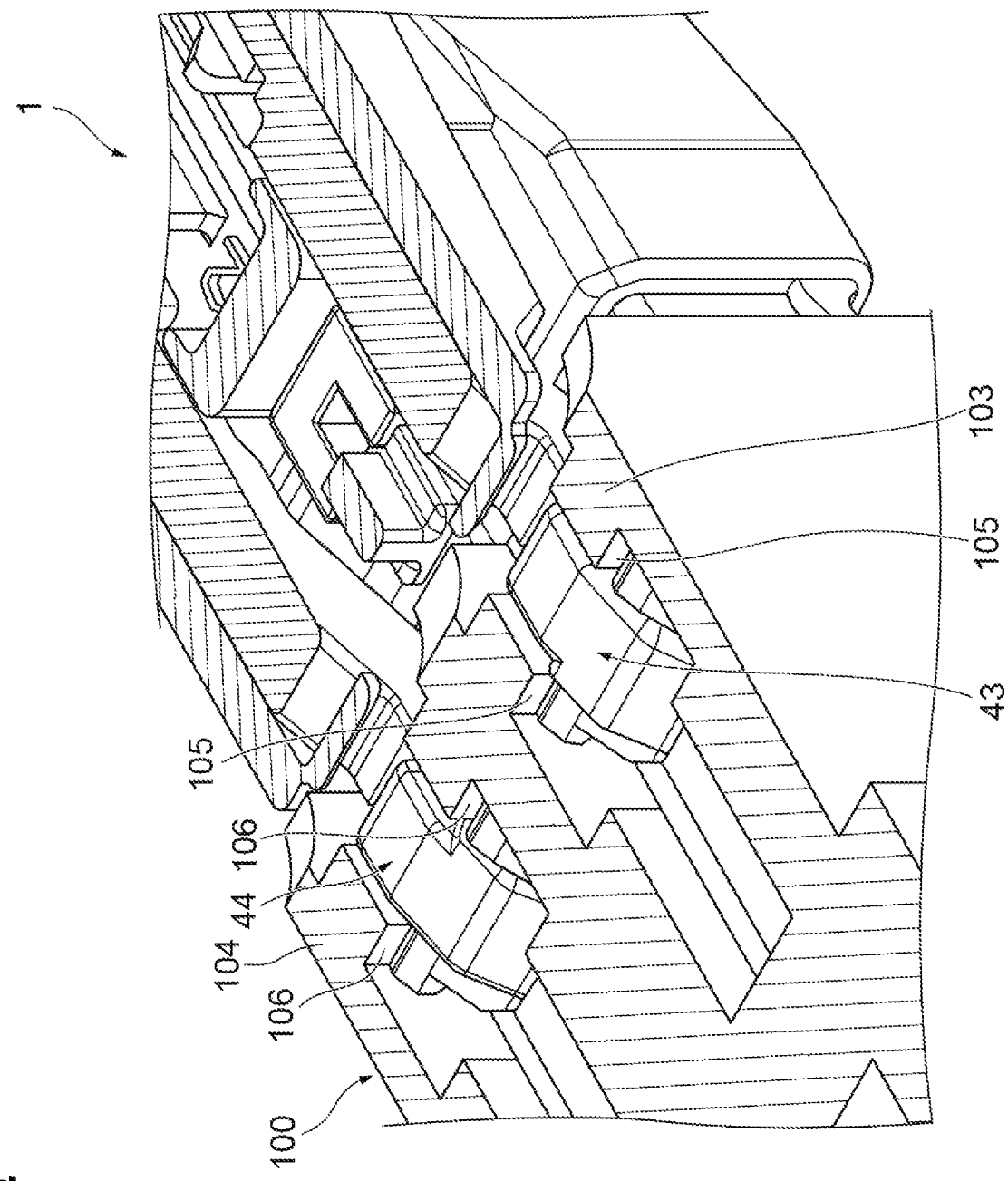
FIG. 14 is a perspective view of an engaging shape of the engaging part of the latch and an engaging part of the adapter when the optical connector is attached to the adapter, in which an upper portion of the engaging shape is cut out for the sake of explanation.
Figure 15:
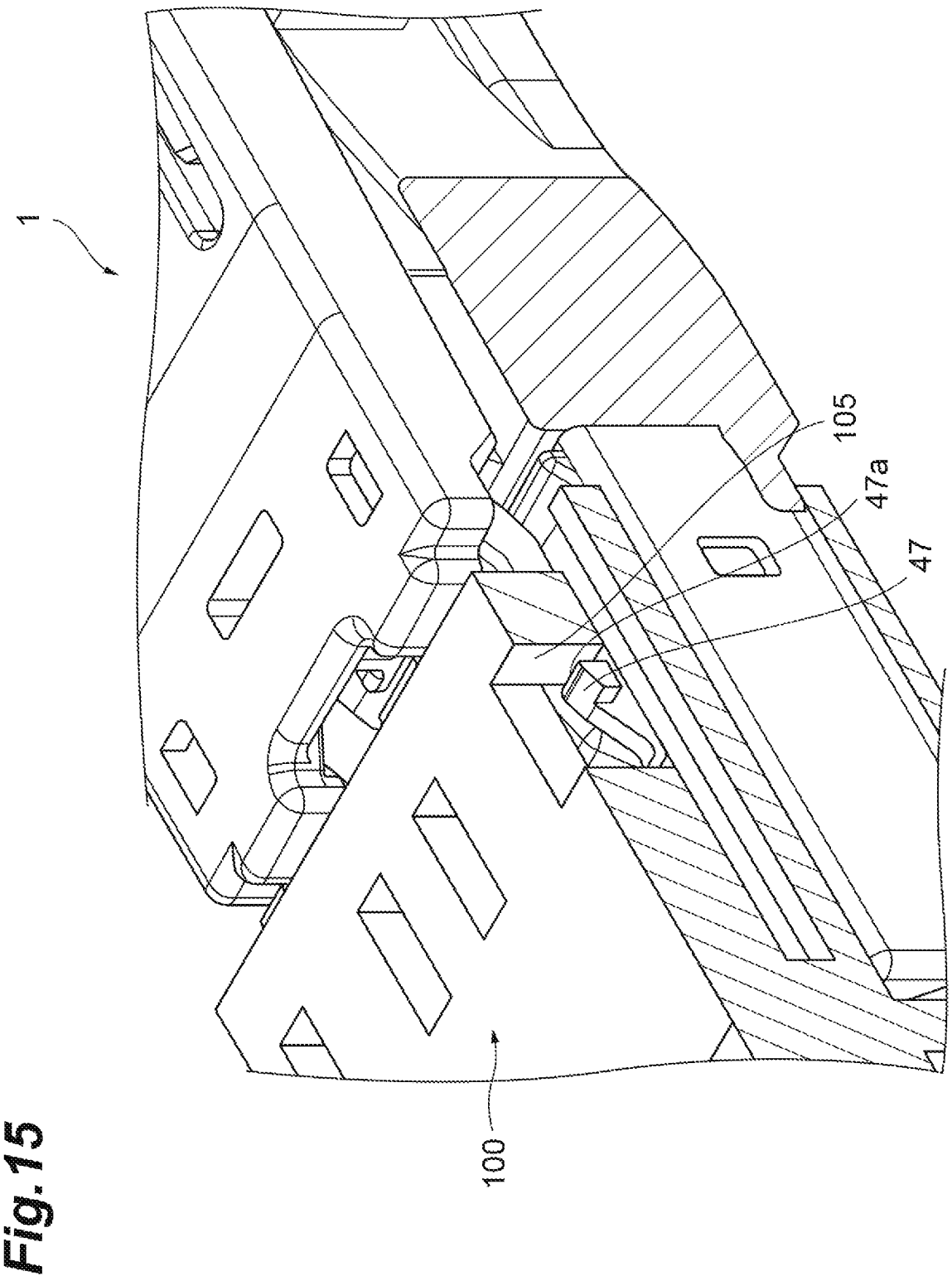
FIG. 15 is a perspective view of the engaging shape of the engaging part of the latch and the engaging part of the adapter when the optical connector is attached to the adapter, in which a side portion of the engaging shape is cut out for the sake of explanation.
Figure 16:
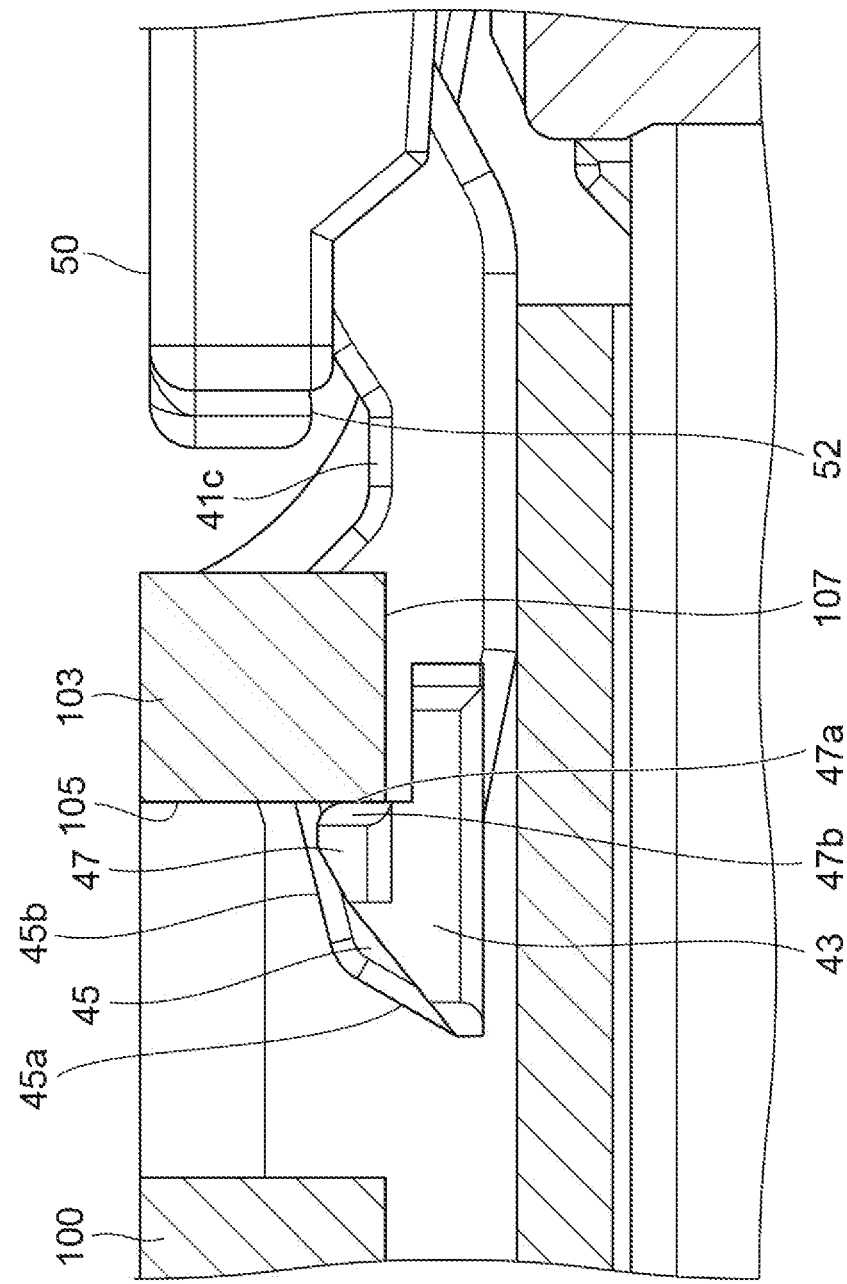
FIG. 16 is a cross-sectional view of the engaging shape of the engaging part of the latch and the engaging part of the adapter when the optical connector is attached to the adapter and is a cross-sectional view cut along a vertically extending plane.
Figure 17:
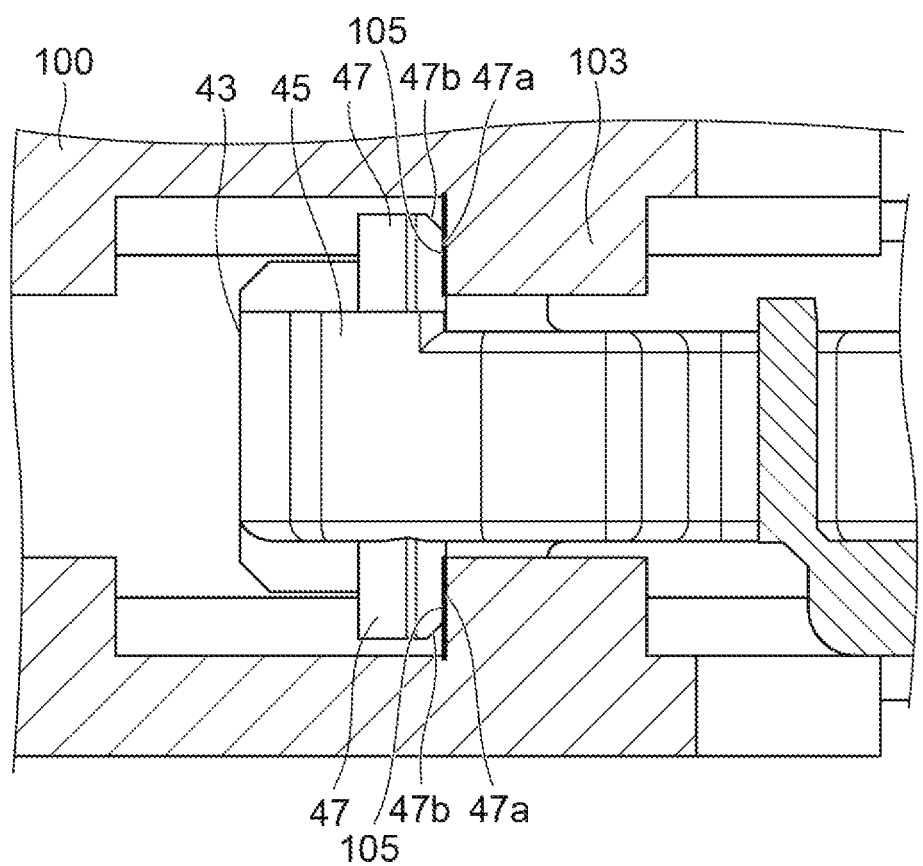
FIG. 17 is a cross-sectional view of the engaging shape of the engaging part of the latch and the engaging part of the adapter when the optical connector is attached to the adapter and is a cross-sectional view cut along a horizontally extending.

Next, a configuration in a case where the engaging parts 43 and 44 each having the above-described configuration are engaged with the adapter 100 will be described with reference to FIGS. 14, 15, 16, and 17. FIG. 14 is a perspective view illustrating an engagement state of the engaging parts 43 and 44 of the latch 40 and the engaging parts 103 and 104 of the adapter 100 when the optical connector 1 is attached to the adapter 100, and is a perspective view in which an upper portion is cut away for explanation. FIG. 15 is a perspective view illustrating the engagement state of the engaging part 43 of the latch 40 and the engaging part 103 of the adapter 100 when the optical connector 1 is attached to the adapter 100, and is a perspective view in which a side portion is cut away for explanation. FIG. 16 is a cross-sectional view illustrating the engagement state of the engaging part 43 of the latch 40 and the engaging part 103 of the adapter 100 when the optical connector 1 is attached to the adapter 100, and is a cross-sectional view taken along a plane extending in the vertical direction. FIG. 17 is a cross-sectional view illustrating an engagement state of the engaging part 43 of the latch 40 and the engaging part 103 of the adapter 100 when the optical connector 1 is attached to the adapter 100, and is a cross-sectional view taken along a plane extending in the horizontal direction.

As illustrate in FIGS. 14 to 17, when the optical connector 1 is attached to the adapter 100, the engaging parts 43 and 44 of the latch 40 engage with the corresponding engaging parts 103 and 104 of the adapter 100, respectively. Thereby, the optical connector 1 is fixed to the adapter 100. As described above, this engagement is performed by the engaging parts 43 and 44 of the optical connector 1 passing from the rear side of the engaging parts 103 and 104 of the adapter 100 to the lower side thereof (under the lower surface 107 or the like) and rising upward again. In this engagement state, the engaging surfaces 105 and 106 of the engaging parts 103 and 104 of the adapter 100 come into contact with the engaging surfaces 47a and 48a of the engaging pares 43 and 44 of the latch 40 to restrict the rearward movement of the latch 40, thereby fixing the optical connector 1 to the adapter 100 so as not to be movable toward the rear end 10b. When the optical connector 1 in the engaged state is removed from the adapter 100, as illustrated in FIG. 16, the engaging protrusion 47 is moved by the tab 50 so as to be located below the engaging part 103 (for example, below the lower surface 107). This movement causes release of the engagement of the optical connector 1 with the adapter 100. At this time, as illustrated in FIG. 17 and the like, the chamfered surface 47b is provided at the outer edge of the engaging surface 47a of the engaging protrusion 47, in which a corner portion that is easily caught by the engaging surface 105 and the like is removed and a contact area is also reduced. Therefore, the engaging surface 47a is less likely to be caught by the engaging surface 105 of the adapter 100, and the downward movement of the engaging protrusion 47 can be smoothly performed. The operation of releasing the engaging part 44 of the latch 40 from the engaging surface 106 of the engaging part 104 of the adapter 100 is the same as the operation of releasing of the engaging part 43.

In the optical connector 1 according to the present embodiment, as described above, the outer edges of the engaging surfaces 47a and 48a of the engaging protrusions 47 and 48 of the latch 40, which is engaged with the adapter 100, are chamfered. Since the engaging surfaces 47a and 48a do not include in the outer edges corner portions which are easily stuck to the engaging parts 103 and 104 of the adapter 100, when the optical connector 1 is pulled out from the adapter 100 and the latch 40 is pushed down, engagement of the engaging parts 43 and 44 of the optical connector 1 and the engaging parts 103 and 104 of the adapter 100 can be surely released. Accordingly, the optical connector 1 can improve capability for inserting and removing the optical connector 1 to/from the adapter 100.

In the optical connector 1, the chamfer dimension of each edge of the engaging surfaces 47a and 48a may be equal to or less than 0.4 mm. In this case, the engagement of the engaging surfaces 47a and 48a with the adapter 100 can be surely performed while improving the capability for inserting and removing the optical connector 1 to/from the adapter 100.

In the optical connector 1, the chamfer dimension of each edge of the engaging surface 47a and 48a may be equal to or less than half of each protruding length of the engaging protrusions 43 and 44 along the lateral direction. In this case, the engagement of the engaging surfaces 47a and 48a with the adapter 100 can be surely performed while improving the capability for inserting and removing the optical connector 1 to/from the adapter 100.

In the optical connector 1, the outer edges of the engaging surfaces 47a and 48a are C chamfered. Thereby, the chamfered shape of each outer edge of the engaging surfaces 47*a* and 48 can be surely formed.

In the optical connector 1, the engaging protrusions 47 and 48 include curved surfaces 47*c* and 48*c*, respectively, which are continuous with each upper edge of the engaging surfaces 47*a* and 48*a*. Thereby, when the optical connector 1 is pulled out from the adapter 1, pull-out operation of the optical connector 1 after releasing the engaging surface 47*a* and 48*a* of the optical connector 1 from the engaging parts 103 and 104 of the adapter 100, can be smoothly performed. In the optical connector 1, a part of each outer edge of the curved surfaces 47*c* and 48*c* may be chamfered.

In the optical connector 1, each of the chamfered surfaces 47*b* and 48*b* may include a pair of straight lines and two curved lines connecting the pair of straight lines with each other. In this case, the engaging protrusions 47 and 48 are provided with more curved portions and thus these portions can further prevent the engaging protrusions 47 and 48 from being stuck with the adapter 100.

In the optical connector 1, the engaging main bodies 45 and 46 may include inclined surfaces 45*a* and 46*a* located closer to the front end, and the inclined surfaces 45*c* and 46*c* that are connected to the inclined surfaces 45*a* and 46*a*, respectively, and located closer to the rear end than the inclined surfaces 45*a* and 46*a*. In addition, the engaging protrusions 47 and 48 may protrude outwardly along the lateral direction from portions of the engaging main bodies 45 and 46 where the inclined surfaces 45*c* and 46*c* are located when viewed from up above, respectively. The engaging protrusions 47*a* and 48 include the inclined surfaces 47*d* and 48*d* located closer to the front end 10*a*, respectively, and each inclination angle of the inclined surfaces 47*d* and 48*d* with respect to the horizontal surface is smaller than each inclination angle of the inclined surfaces 45*a* and 46*a* with respect to the horizontal surface and is larger than each inclination angle of the inclined surface 45*c* and 46*c* with respect to the horizontal surface.

The optical connector 1 include the pair of engaging protrusions 47 and the pair of engaging protrusions 48. Thereby, each engaging part of the latch 40 is provided with two engaging protrusions protruding in opposite directions each other and thus the engagement of the latch 40 with the adapter 100 is performed in a fine balance along the lateral direction (horizontal direction). Accordingly, the optical connector 1 prevents from deviating in the lateral direction when engaging with the adapter 100 and/or releasing from the engaged adapter 100 and then the engaging and the releasing can be smoothly performed. Therefore, the capability for inserting and removing the optical connector 1 to/from the adapter 100 can further improved.

In the optical connector 1, the distal ends at which the engaging parts 43 and 44 of the latch 40 are provided floats to spaced apart from the front housings 10 and 11 in the normal state. Thus, a region corresponding to distal ends of a conventional latch can be reduced in size to achieve weight reduction of the optical connector 1. In addition, the protrusions 53 and 54 are disposed on the inner side of the tab 50 between the front end of the optical connector 1 and the proximal end of the latch 40 in this optical connector 1, and the inner side of the latch 40 comes into contact with the protrusions 53 and 54 and the engaging parts 43 and 44 of the latch 40 are pushed down toward the front housing 10 and 11 with the protrusions 53 and 54 as a fulcrum when the engaging parts 43 and 44 of the latch 40 are engaged with the adapter 100. According to this configuration, when the engaging parts 43 and 44 of the latch 40 are engaged with the adapter 100, the latch 40 can be deformed toward the front housings 10 and 11 with the protrusions 53 and 54 disposed close to the distal end of the latch 40 with respect to the proximal end thereof as a fulcrum, rather than deforming the latch 40 toward the front housings 10 and 11 with the proximal end as a fulcrum. As a result, a deformation distance from the fulcrum decreases, and thus an elastic force of the deformed latch 40 (engaging parts 43 and 44) increases and a click feeling when each of the engaging parts 43 and 44 of the latch 40 is engaged with the external device can be improved. According to the optical connector 1, it is possible to achieve weight reduction of the optical connector and provide a desired click feeling to a user when it is attached to the adapter 100.

While the embodiments of the present disclosure have been described in detail above, the present disclosure is not limited to the above-described embodiments and can be applied to various embodiments. For example, in the above-described embodiment, Although the embodiments of the present disclosure have been described in detail, the present disclosure is not limited to the above-described embodiments and can be applied to various embodiments. For example, in the above-described embodiment, an example of an optical connector that accommodates the pair of optical fibers has been described, but the present embodiment may be applied to an optical connector that accommodates one optical fiber, may be applied to an optical connector that accommodates three or more optical fibers, or may be applied to other various optical connectors. Further, the chamfered surfaces 47*b* and 48*b* provided at the outer edges of the engaging surfaces 47*a* and 48*a* of the engaging parts 43 and 44 of the latch 40 are C-chamfer, but may be R-chamfer.

What is claimed is:

1. An optical connector including a front end and a rear end opposite to the front end along a first direction, the optical connector comprising:
    at least one ferrule configured to hold an optical fiber therein at the front end of the optical connector;
    an outer housing located closer to the rear end of the optical connector than the ferrule; and
    a latch connected to the outer housing and extending along the first direction from a proximal end having a connecting part with the outer housing toward the front end of the optical connector, the latch including at least one engaging part configured to engage with an external device at a distal end thereof, the latch being configured such that the engaging part is pushed down toward the ferrule along a second direction intersecting the first direction,
    wherein the engaging part comprises an engaging main body extending along the first direction and at least one engaging protrusion protruding outwardly from the engaging main body along a third direction intersecting both of the first direction and the second direction,
    wherein the engaging protrusion includes an engaging surface configured to engage with the external device, at the rear of the engaging protrusion, and an edge of the engaging surface is chamfered.

2. The optical connector according to claim 1, wherein a chamfer dimension of the edge of the engaging surface is equal to or less than 0.4 mm.

3. The optical connector according to claim 1, wherein a chamfer dimension of the edge of the engaging surface is equal to or less than half of a protruding length of the engaging protrusion along the third direction.

4. The optical connector according to claim 1, wherein the edge of the engaging surface is C chamfered or R-chamfered.

5. The optical connector according to claim 1, wherein the engaging protrusion includes a curved surface that is continuous with an upper edge of the engaging surface, wherein the upper edge is opposite to the downward direction along the second direction.

6. The optical connector according to claim 5, wherein a part of an edge of the curved surface is chamfered.

7. The optical connector according to claim 1, wherein the chamfered surface includes a pair of straight lines and two curved lines connecting the pair of straight lines with each other.

8. The optical connector according to claim 1,
wherein the engaging main body includes a first inclined surface located closer to the front end, and a second inclined surface that is connected to the first inclined surface and located closer to the rear end than the first inclined surface, and
wherein the engaging protrusion protrudes outwardly along the third direction from a portion of the engaging main body where the second inclined surface is located when viewed from the second direction.

9. The optical connector according to claim 8, wherein the engaging protrusion includes a third inclined surface located closer to the front end, and an inclination angle of the third inclined surface with respect to the first direction is smaller than an inclination angle of the first inclined surface with respect to the first direction and is larger than an inclination angle of the second inclined surface with respect to the first direction.

10. The optical connector according to claim 1, wherein the at least one engaging protrusion includes a first engaging protrusion protruding outwardly from the engaging main body along the third direction, and a second engaging protrusion protruding outwardly from the engaging main body along the third direction in a direction opposite to the first engaging protrusion.

11. The optical connector according to claim 1, wherein the latch includes a first latch member extending along the first direction from an first proximal end having a connecting part with the outer housing toward the front end of the optical connector, and a second latch member extending in parallel with the first latch member from a second proximal end having a connecting part with the outer housing toward the front end of the optical connector, and the engaging part is provided with each distal end of the first latch member and the second latch member.

12. The optical connector according to claim 1, further comprising:
a housing body configured to house the ferrule therein such that a tip end of the ferrule is exposed at the front end of the optical connector, the housing body being connected to the outer housing; and
a tab placed on an outer side of the latch to cover at least a part of the latch and connected to the outer housing to be movable along the first direction with respect to the outer housing, the tab being configured to push down the engaging part of the latch toward the housing body according to movement of the tab along the first direction from the front end toward the rear end,
wherein the distal end of the latch floats to space apart from the housing body,
wherein the tab includes at least one protrusion disposed on an inner side of the tab between the front end of the optical connector and the proximal end of the latch, and the optical connector is configured to contact an inner side of the latch with the protrusion to push down the engaging part toward the housing body with the protrusion as a fulcrum when the engaging part of the latch is engaged with the external device.

* * * * *